May 7, 1963   R. W. BEMMANN ET AL   3,088,337
TRANSMISSION CONTROL SYSTEM
Filed March 27, 1961   2 Sheets-Sheet 1

INVENTOR.
Richard W. Bemmann
BY & David W. Turner

Hugh L. Fisher
ATTORNEY

United States Patent Office 3,088,337
Patented May 7, 1963

3,088,337
TRANSMISSION CONTROL SYSTEM
Richard W. Bemmann, Flint, Mich., and David W. Turner, Milwaukee, Wis., assignors to General Motors Corporation, Detroit, Mich., a corporation of Delaware
Filed Mar. 27, 1961, Ser. No. 98,481
12 Claims. (Cl. 74—752)

This invention relates in general to transmissions and particularly to improved control systems therefor.

In automatic vehicle transmissions of the plural step ratio type, each change in ratio should occur according to a certain optimum scheme or pattern if these shifts or transitions are to be smooth and imperceptible to the driver. Necessarily, the shift pattern must consider the driver's desires as well as the torque characteristics of the vehicle engine. For reproducing the desired transmission shift pattern, it has been customary to utilize a fluid pressure operated control system. Such a system, of course, involves complexity since compensation for certain inherent and objectionable characteristics must be made by various calibration schemes.

It is, therefore, an aim of this invention, in overcoming the disadvantages of a fluid pressure operated transmission control system, to provide a simple electrically operated control system capable of coordinating ratio changes with vehicle speed and engine torque demand with a minimum number of components. More specifically, it is proposed by the invention to develop an electrical effect corresponding in frequency to the speed of the vehicle and utilize this electrical effect when of a predetermined frequency level to alter the transmission drive ratio. Additionally, it is proposed to vary this predetermined frequency level with engine torque demand.

The foregoing and other objects and advantages of the invention will be apparent from the following description and from the accompanying drawings in which.

Figure 1:
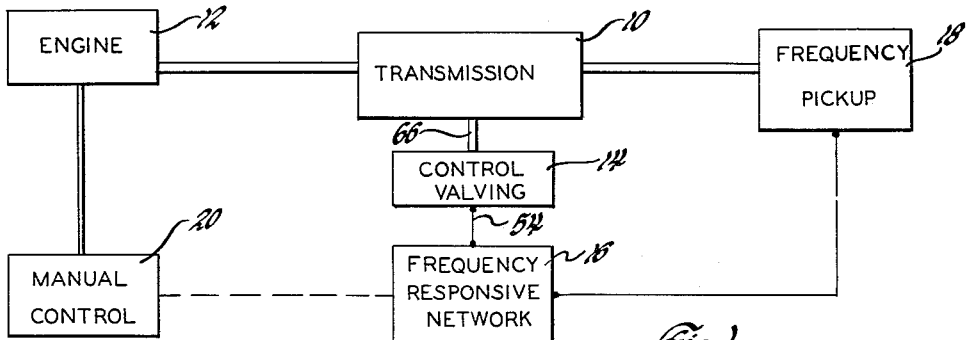
FIGURE 1 is a block diagram of a system incorporating the principles of the invention.
Figure 3:
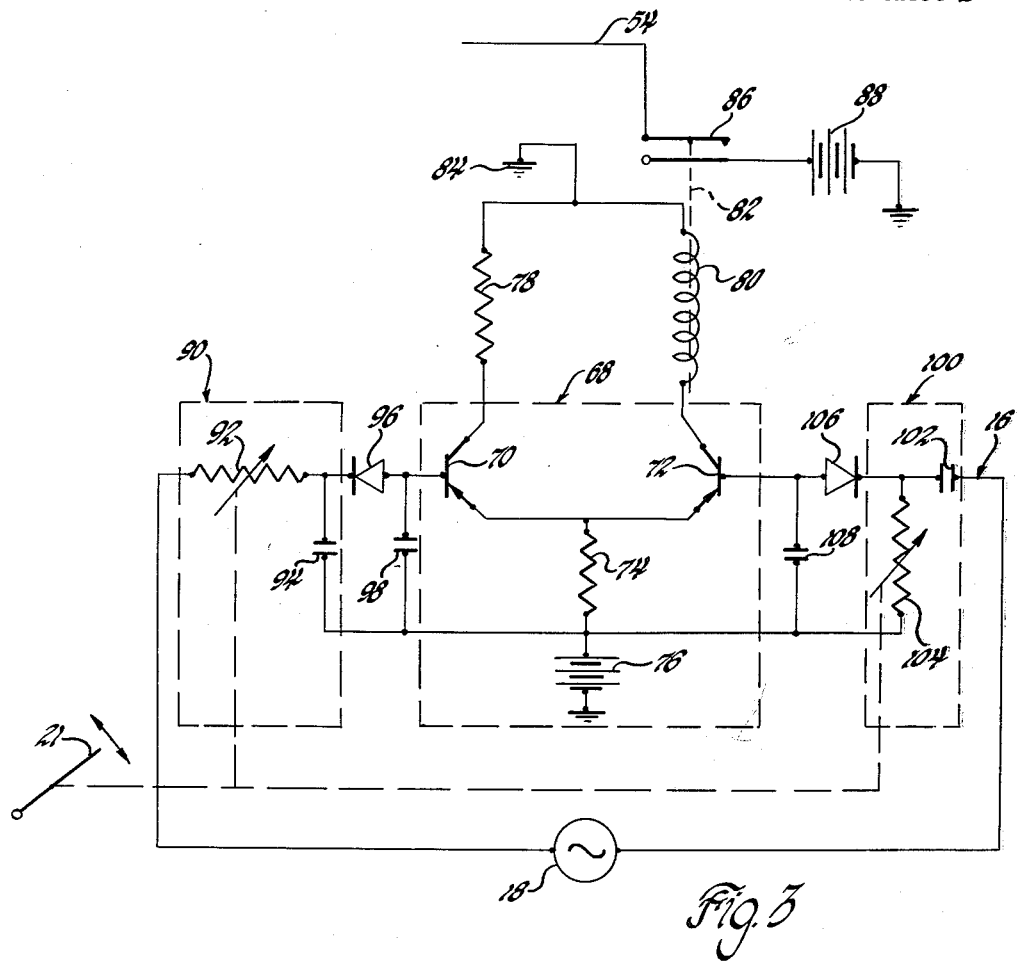
FIGURE 3 is a circuit diagram of the frequency responsive network utilized in the system.

Referring to the drawings in detail, and initially to FIGURE 1, the numeral 10 denotes generally a transmission, which may be of the type disclosed in the Gelenius et al. application S.N. 721,451 filed March 14, 1958. The transmission 10 has the input thereof connected to a vehicle engine 12 and the output is drive connected in the usual way to the vehicle wheels (not shown). The transmission 10 is of the plural step ratio type employing suitable ratio changing devices that are actuated by control valving 14. The control valving 14 in turn is operated by a frequency responsive network 16, which is coupled to a frequency developing arrangement. This frequency developing arrangement may be some type of frequency pickup such as a generator 18 driven by the output of the transmission 10 so as to develop a signal voltage having a frequency that corresponds to vehicle speed. In order to render the frequency responsive network 16 also conscious of engine torque demand, an appropriate manual control 20, for instance a vehicle accelerator pedal 21 shown in FIGURE 3 is employed.

Figure 2:
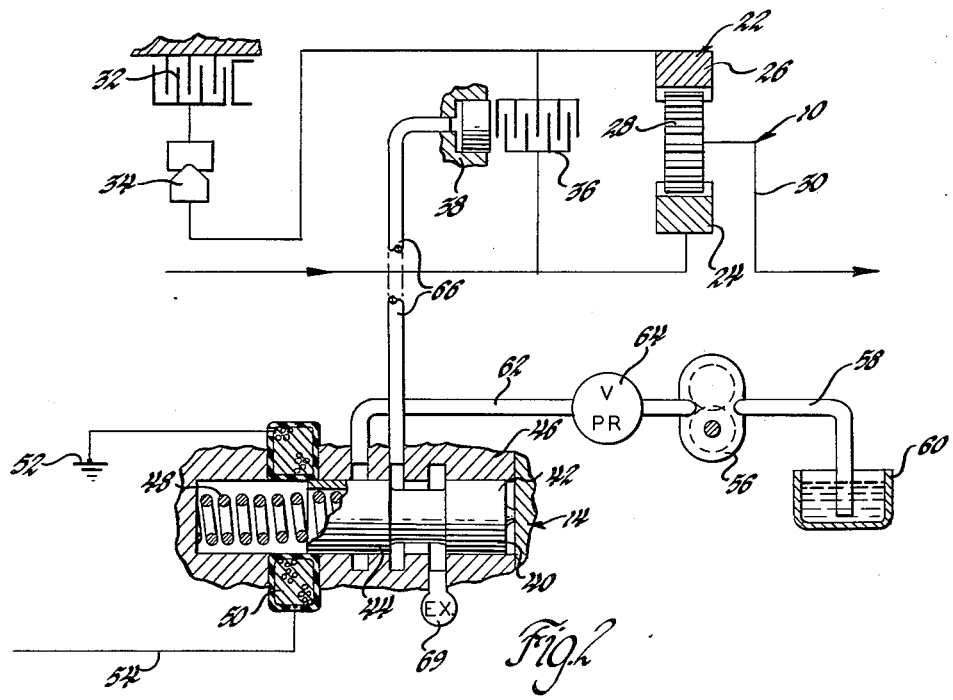
FIGURE 2 is a schematic diagram of control valving for the system and its relationship to the transmission.

For demonstrating the invention, a single planetary gear unit 22 is shown in FIGURE 2. Of course, a number of gearsets, either serially connected or suitably compounded, may be employed for obtaining the desired number of ratios, e.g., as disclosed in the mentioned Gelenius et al. application. The gear unit 22 includes an input sun gear 24 that may be engine driven and a reaction ring gear 26. Both of these gears 24 and 26 mesh with one or more planet pinions 28 revolvably mounted on an output planet carrier 30. The output planet carrier 30 may be drive connected to the vehicle wheels or other gearing in any known way. The gear unit 22 is capable of providing a reduced drive ratio whenever a forward brake 32 is engaged, since the engaged forward brake 32 will through a one-way device 34 resist any backward rotational tendency of the reaction ring gear 26. Therefore, with the input sun gear 24 revolving forwardly, the output carrier 30 will be driven at a slower speed relative to that of the input sun gear 24.

The one-way device 34 may be of known construction employing sprags, rollers, or other suitable locking elements for preventing relative rotation between the races in one direction. By utilizing the one-way device 34, a direct drive clutch 36 interposed between the sun and ring gears 24 and 26 may be engaged by a piston type servomotor 38 at any time without having to disengage the forward brake 32. This is because the engagement of the direct drive clutch 36 will cause the reaction ring gear 26 to rotate forwardly with the input sun gear 24, this motion being permitted by the one-way device 34, whereupon the gear unit 22 will become locked up for a direct drive ratio.

The control valving 14 employs a single spool type valve 40 that includes spaced lands 42 and 44 and that is slidably positioned within a bore in a valve body 46. A spring 48 urges the valve 40 to the downshift position shown. Movement of the valve 40 to the upshift position, i.e., the leftmost position in FIGURE 2, is accomplished by energizing, as will become apparent, a winding 50 grounded at 52 and connected to the frequency responsive network 16 by a supply conductor 54. When the winding 50 is energized, the land 44 performs as an armature and the valve 40 is shifted leftwardly.

Pressure fluid to be transferred by the valve 40 is furnished by a suitable pump 56, e.g., a vane or gear pump. Preferably, the pump 56 is driven by the engine 12 so as to be immediately operative when the engine starts and has an inlet 58 communicating with a sump 60 and an outlet 62 extending to the bore of the valve body 46. In the outlet 62, a pressure regulator valve 64 may be installed so as to establish a desired pressure level.

With the control valve 40 in the downshift position, the pressure fluid in the outlet 62 is prevented by land 44 from proceeding to a supply line 66 extending to the servomotor 38. Any pressure fluid in the supply line 66 is drained between the lands 42 and 44 through an exhaust port 69 in the valve bore. Consequently, the direct drive clutch 36 is disengaged and the gear unit 22 performs as an underdrive. Once the valve 40 is moved to the upshift position, communication is established between the pump outlet 62 and the supply line 66 and the exhaust port 69 is blocked by land 42. This, of course, engages the clutch 36 and locks up the gear unit 22.

Considering now FIGURE 3, the torque responsive network 16 illustrated employs a differential amplifier 68 comprising two amplifying devices as transistors 70 and 72, each having emitter, collector, and base or control electrodes. Both of the emitters for the transistors 70 and 72 are connected to a bias arrangement including a bias resistor 74 and a grounded B+ source such as battery 76. The collector of the transistor 70 is connected to a load resistor 78, whereas the collector of the transistor 72 is connected to a winding 80 for a relay 82. Both the load resistor 78 and the winding 80 are grounded at 84. The relay 82 operates contacts 86 so that when closed, a battery 88, which if desired can be the vehicle battery, is connected by the supply line 54 to the winding 50 for a control valving 14. This, as mentioned, causes the winding 50 to be energized and the control valve 40 to be moved to the upshift position.

The base for each of the transistors 70 and 72 is connected to the generator 18 so as to have a signal voltage at the frequency corresponding to vehicle speed applied thereto. The circuit connecting the generator 18 and the base for the transistor 70 has therein a low pass filter 90 comprising a variable resistor 92 and a capacitor 94. This circuit also has a rectifier 96 and a filter capacitor 98. On the other hand, the circuit between the generator 18 and the base for the transistor 72 has a high pass filter 100 including a capacitor 102 and a variable resistor 104. This latter circuit likewise has a rectifier and a filter capacitor designated respectively by the numerals 106 and 108. Preferably, the values of the capacitors 94 and 102 are equal as are the values of the resistors 92 and 104. Both of the variable resistors 92 and 104 are connected in any suitable way to the accelerator pedal 21 so that their values will be varied in accordance with the angular position thereof.

In operation, it will initially be assumed that vehicle speed is below that at which a ratio change is desired, i.e., the speed at which the direct drive clutch 36 is to be engaged and that the position of the accelerator pedal 21 is maintained fixed. With these conditions, the frequency of the signal voltage developed by the generator 18 will be passed by the low pass filter 90 and then rectified and filtered by the rectifier 96 and capacitor 98 so as to apply D.C. voltage to the base of the transistor 70. As a result, the transistor 70 will be conductive completing a circuit extending from the battery 76 through the bias resistor 74, the transistor 70, and the load resistor 78 to ground at 84. The resultant voltage drop across the bias resistor 74 causes the transistor 72 to be cut off since the base of transistor 72 will be held at a positive potential relative to the emitter therefor. Hence, the winding 80 of the relay 82 will remain deenergized.

Figure 4:
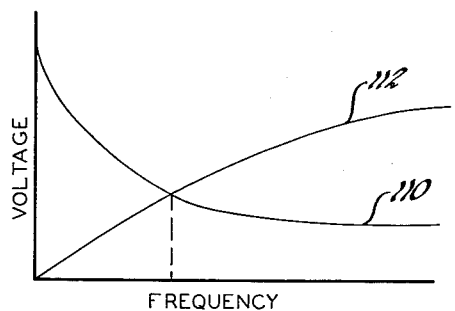
FIGURE 4 is a curve illustrating the relationship between the voltages developed in the frequency responsive network.

Upon attainment of the vehicle speed at which the ratio change is to take place, the voltage passed by the low pass filter 90 reduces as shown along curve 110 in FIGURE 4 so that the transistor 70 approaches cutoff. The voltage passed by the high pass filter 100 increases along curve 112 in FIGURE 4 and now attains a value sufficient to cause the transistor 72 to become favorably biased and conductive. When the transistor 72 goes to full conduction, the transistor 70 will cut off. Consequently, a circuit extending from the battery 76 through transistor 72 and the winding 80 to ground at 84 is completed. This energizes the relay 82 and closes the contacts 86 whereupon, as previously explained, the control valving winding 50 is energized and the control valve 40 moved to the upshift position. In the upshift position of the valve 40, pressure fluid is supplied to the direct drive clutch 36 in the aforedescribed way, and a direct drive ratio is established through the planetary gear unit 22.

With the suggested circuit parameters, the upshift will occur, as seen in FIGURE 4, at the intersection of the curves 110 and 112 and at a frequency corresponding to the desired speed. This shift point can be varied and the point of intersection changed with accelerator position so that if the torque demand is great, the shift will not occur until a higher vehicle speed is attained and accordingly an increased signal voltage. On the other hand, if the torque demand is slight, the shift will occur at a substantially lower speed.

It should be kept in mind that only a single planetary gear unit and the controls therefor are described such only being required to demonstrate the invention, but if additional ratios are required, much of the structure can be duplicated as determined by arrangement of the planetary gearing.

From the foregoing, it can be seen that the electrically operated transmission control system is simple and uncomplicated as well as being very responsive to changing conditions. Moreover, this response is attainable with a minimum of calibrating components.

The invention is to be limited only by the following claims.

We claim:

1. In a vehicle transmission control system, the combination of ratio changing means for varying the drive ratio of the transmission, means developing an electrical effect corresponding in frequency to the speed of the vehicle, and means responsive to the frequency of the electrical effect, the frequency responsive means including means attenuating frequencies outside a certain frequency range, the frequency responsive means being operative to cause the ratio changing means to be actuated whenever the frequency of the electrical effect is within the certain frequency range.

2. In a vehicle transmission control system, the combination of ratio changing means for varying the drive ratio of the transmission, means developing an electrical effect corresponding in frequency to the speed of the vehicle, means responsible to the frequency of the electrical effect, the frequency responsive means including means attenuating frequencies outside a certain frequency range, the frequency responsive means being operative to cause the ratio changing means to be actuated whenever the frequency of the electrical effect is within the certain frequency range, and means varying the certain frequency range.

3. In a control system for an engine driven vehicle, the combination of ratio changing means for varying the drive ratio of the transmission, means developing an electrical effect corresponding in frequency to the speed of the vehicle, means responsive to the frequency of the electrical effect, the frequency responsive means including means attentuating frequencies outside a certain frequency range, the frequency responsive means being operative to cause the ratio changing means to be actuated whenever the frequency of the electrical effect is within the certain frequency range, and means varying the certain frequency range in response to torque demand on the engine.

4. In a transmission control system for an engine driven vehicle, the combination of ratio changing means for varying the drive ratio of the transmission, means developing an electrical signal corresponding in frequency to the speed of the vehicle, an electrical network responsive to the frequency of the signal, the frequency responsive network including low and high frequency responsive means coupled to the signal developing means and developing output signals in accordance with the frequency of the electrical signal, means comparing the output signals and developing therefrom a control signal for causing the ratio changing means to alter the drive ratio whenever the frequency of the signal is at a predetermined level, and means varying the predetermined level in accordance with the torque demand on the engine.

5. In a vehicle transmission control system, the combination of ratio changing means for varying the drive ratio of the transmission, a frequency pickup for developing an electrical signal corresponding in frequency to the speed of the vehicle, and a frequency responsive network including low and high frequency responsive means coupled to the frequency pickup and developing output signals in accordance with the frequency of the electrical signal, and means comparing the output signals and developing therefrom a control signal for causing the ratio changing means to alter the drive ratio whenever the frequency of the electrical signal is at a predetermined level.

6. In a vehicle transmission control system, the combination of ratio changing means for varying the drive ratio of the transmission, means developing a signal corresponding in frenquency to vehicle speed, and a frequency responsive network including low and high frequency responsive means coupled to the signal developing means, the low frequency responsive means being operative to cause the ratio changing means to establish one drive ratio when the frequency of the signal is below a predetermined level and the high frequency responsive means being operative to cause the ratio changing means to establish another drive ratio when the frequency of the signal is at the predetermined level.

7. In a vehicle transmission control system, the combination of ratio changing means for varying the drive ratio of the transmission, means developing a signal corresponding in frequency to vehicle speed, a frequency responsive network including low and high frequency responsive means coupled to the signal developing means, the low frequency responsive means being operative to cause the ratio changing means to establish one drive ratio when the frequency of the signal is below a predetermined level and the high frequency responsive means being operative to cause the ratio changing means to establish another drive ratio when the frequency of the signal is at the predetermined level, and means varying the predetermined level.

8. In a vehicle transmission control system, the combination of ratio changing means for varying the drive ratio through the transmission, means developing a signal corresponding in frequency to vehicle speed, a frequency responsive network coupled to the signal developing means, the frequency responsive network including a semiconductor device having the input operatively connected to the signal developing means and the output operatively connected to the ratio changing means, and means biasing the amplifying device beyond cut-off when the frequency of the signal is below a certain level, the semiconductor device being conductive when the signal is at the certain level so as to cause the ratio changing means to alter the drive ratio.

9. In a transmission control system for an engine driven vehicle, the combination of ratio changing means for varying the drive ratio through the transmission, means developing a signal corresponding in frequency to vehicle speed, a frequency responsive network coupled to the signal developing means, the frequency responsive network including a semiconductor device having the input coupled to the signal developing means and the output operatively connected to the ratio changing means, means biasing the semiconductor device beyond cut-off when the frequency of the signal is below a predetermined level, the semiconductor device being conductive when the signal is at the predetermined level so as to cause the ratio changing means to alter the drive ratio, and means varying the predetermined level with torque demand on the engine.

10. In a transmission control system for an engine driven vehicle, the combination of ratio changing means for varying the drive ratio of the transmission, means developing a signal corresponding in frequency to vehicle speed, and a frequency responsive network for controlling the ratio changing means, the frequency responsive network including a pair of amplifying devices, each having the inputs thereof coupled to the signal developing means, and bias means for the amplifying devices, one of the devices including a low pass filter and a rectifier in the input thereto and having the bias means in the output thereof, the other device including a high pass filter and a rectifier in the input and having the output thereof operatively connected to the ratio changing means, the one device being conductive when the frequency of the signal is below a predetermined level so as to cause the bias means to render the other device non-conductive, the other device becoming conductive when the frequency of the signal is at the predetermined level so as to cause the ratio changing means to change the drive ratio.

11. In a transmission control system for an engine driven vehicle, the combination of ratio changing means for varying the drive ratio of the transmission, means developing a signal corresponding in frequency to vehicle speed, and a frequency responsive network for controlling the ratio changing means, the frequency responsive network including a pair of amplifying devices each having the inputs thereof coupled to the signal developing means, bias means for the amplifying devices, one of the devices including a low pass filter and a rectifier in the input thereto and having the bias means in the output thereof, the other device including a high pass filter and a rectifier in the input and having the output thereof operatively connected to the ratio changing means, the one device being conductive when the frequency of the signal is below a predetermined level so as to cause the bias means to render the other device non-conductive, the other device becoming conductive when the signal is at the predetermined frequency so as to cause the ratio changing means to change the drive ratio, and engine throttle controlling means for varying the predetermined level.

12. In a transmission control system for an engine driven vehicle, the combination of ratio changing means for varying the drive ratio of the transmission, means developing a signal corresponding in frequency to vehicle speed, a frequency responsive network for controlling the ratio changing means, the frequency responsive network including a pair of amplifying devices each having the input thereof coupled to the signal developing means, one of the devices including a low frequency responsive means in the input thereof, the other device including a high frequency responsive means in the input thereof, the one device being so arranged when the frequency of the signal is below a predetermined level as to establish a cut-off bias for the other device, the other device becoming conductive when the frequency is at the predetermined level so as to cause the ratio changing means to alter the drive ratio, and means varying the response of the low and high frequency responsive means in accordance with torque demand so as to change the predetermined frequency.

References Cited in the file of this patent

UNITED STATES PATENTS

| | | |
|---|---|---|
| 2,910,884 | Peras | Nov. 3, 1959 |
| 2,952,346 | Costa et al. | Sept. 13, 1960 |
| 2,981,121 | Peras | Apr. 25, 1961 |
| 2,986,045 | Peras | May 30, 1961 |
| 2,998,538 | O'Mahony | Aug. 29, 1961 |